(12) United States Patent
Koda

(10) Patent No.: US 11,613,997 B2
(45) Date of Patent: Mar. 28, 2023

(54) STEAM TURBINE

(71) Applicant: MITSUBISHI HEAVY INDUSTRIES COMPRESSOR CORPORATION, Tokyo (JP)

(72) Inventor: Takuro Koda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 24 days.

(21) Appl. No.: 17/160,723

(22) Filed: Jan. 28, 2021

(65) Prior Publication Data

US 2021/0262357 A1    Aug. 26, 2021

(30) Foreign Application Priority Data

Feb. 25, 2020 (JP) .............. JP2020-029441

(51) Int. Cl.
| | |
|---|---|
| F01D 9/04 | (2006.01) |
| F01D 1/16 | (2006.01) |
| F01D 5/14 | (2006.01) |
| F01D 1/04 | (2006.01) |

(52) U.S. Cl.
CPC .......... F01D 9/041 (2013.01); *F05D 2220/31* (2013.01); *F05D 2240/12* (2013.01); *F05D 2240/24* (2013.01); *F05D 2240/60* (2013.01)

(58) Field of Classification Search
CPC ............ F01D 9/041; F01D 1/16; F01D 5/142; F01D 5/143; F01D 5/145; F01D 5/06; F01D 5/225; F01D 11/001; F01D 11/08; F01D 17/162; F01D 25/24; F05D 2220/31; F05D 2220/3212; F05D 2240/12; F05D 2240/24; F05D 2240/60; F05D 2240/301; F05D 2240/307; F05D 2260/2322; F05B 2240/11; F05B 2240/12
See application file for complete search history.

(56) References Cited

U.S. PATENT DOCUMENTS

| | | | | |
|---|---|---|---|---|
| 4,403,915 | A | * | 9/1983 | Teufelberger ............. F01D 1/16 415/199.5 |
| 2018/0038230 | A1 | * | 2/2018 | Koda ........................ F01D 1/16 |
| 2021/0189883 | A1 | * | 6/2021 | Koda ...................... F01D 9/065 |

FOREIGN PATENT DOCUMENTS

JP    H09242502 A    9/1997

* cited by examiner

*Primary Examiner* — Eric J Zamora Alvarez
(74) *Attorney, Agent, or Firm* — Osha Bergman Watanabe & Burton LLP

(57) ABSTRACT

A steam turbine includes a guide member that is disposed between a first rotor blade row and a second stator vane row to guide a fluid from the first rotor blade row toward the second stator vane row. When seen in a circumferential direction, an outer peripheral surface of an inner ring of the second stator vane row is disposed farther to an inner side in a radial direction than an outer peripheral surface of a platform of the first rotor blade row. The guide member has a guide surface that extends from an outer peripheral surface of a shroud of the first rotor blade row toward an inner peripheral surface of an outer ring of the second stator vane row so as to be inclined toward the inner side in the radial direction as the guide surface approaches a second side from a first side in an axial direction.

5 Claims, 2 Drawing Sheets

STEAM TURBINE

BACKGROUND OF THE INVENTION

Field of the Invention

The present disclosure relates to a steam turbine.

Priority is claimed on Japanese Patent Application No. 2020-029441, filed on Feb. 25, 2020, the content of which is incorporated herein by reference.

Description of Related Art

For example, as described in Japanese Unexamined Patent Application, First Publication No. H9-242502, a steam turbine includes a rotor that rotates around an axis and a casing that covers the rotor. The rotor includes a rotor shaft that is centered around the axis to extend in an axial direction, and a plurality of rotor blade rows that are fixed to an outer periphery of the rotor shaft to be arranged in the axial direction. The steam turbine includes stator vane rows that each are fixed to an inner periphery of the casing and are disposed upstream of each of the plurality of rotor blade rows.

SUMMARY OF THE INVENTION

When the rotation speed of the rotor blade rows of the steam turbine is decreased, the speed ratio which is the ratio of the peripheral speed of rotor blades to the steam speed at a nozzle outlet is decreased. Then, the reaction degree of steam is decreased, and the pressure difference of the steam before and after a pair of the stator vane row and the rotor blade row is decreased. When the reaction degree is less than 0 (minus), the pressure upstream of the stator vane row and the rotor blade row is lower than the pressure downstream thereof, and as a result, backflow of the steam occurs.

The present disclosure provides a steam turbine capable of suppressing a decrease in reaction degree to suppress the backflow of steam even when the rotation speed of a rotor blade row is decreased.

According to the present disclosure, a steam turbine is provided including: a rotor shaft that is configured to rotate around an axis; a plurality of rotor blade rows that are fixed to an outer side of the rotor shaft in a radial direction with respect to the axis and are disposed at intervals in an axial direction in which the axis extends; a casing which covers the rotor shaft and the plurality of rotor blade rows and inside which a main flow path through which a fluid flows is formed; a plurality of stator vane rows that each are fixed to an inner side of the casing in the radial direction and are disposed on a first side in the axial direction with respect to each of the plurality of rotor blade rows; and a guide member that is disposed between a first rotor blade row disposed farthest to the first side in the axial direction among the plurality of rotor blade rows and a second stator vane row disposed on a second side in the axial direction with respect to the first rotor blade row, to configured to guide the fluid from the first rotor blade row toward the second stator vane row. Each of the plurality of rotor blade rows includes a plurality of rotor blade bodies disposed in the main flow path, a shroud disposed on an outer side with respect to each of the plurality of rotor blade bodies in the radial direction to correspond to each of the plurality of rotor blade bodies, and a platform disposed on an inner side with respect to each of the plurality of rotor blade bodies in the radial direction to correspond to each of the rotor blade bodies. Each of the plurality of stator vane rows includes a plurality of stator vanes disposed in the main flow path, an outer ring having an annular shape and disposed on an outer side with respect to each of the plurality of stator vanes in the radial direction, and an inner ring having an annular shape and disposed on an inner side with respect to each of the plurality of stator vanes in the radial direction. When seen in a circumferential direction around the axis, an outer peripheral surface of the inner ring of the second stator vane row is disposed farther to an inner side in the radial direction than an outer peripheral surface of the platform of the first rotor blade row. The guide member has a guide surface that extends from an outer peripheral surface of the shroud of the first rotor blade row toward an inner peripheral surface of the outer ring of the second stator vane row so as to be inclined toward the inner side in the radial direction as the guide surface approaches the second side from the first side in the axial direction.

According to the steam turbine of the present disclosure, even when the rotation speed of the rotor blade rows is decreased, a decrease in reaction degree is suppressed, and thereby, the backflow of steam can be suppressed.

DETAILED DESCRIPTION OF THE INVENTION

Hereinafter, a mode for carrying out a steam turbine according to the present disclosure will be described with reference to the accompanying drawings. However, the present disclosure is not limited only to the embodiment.

(Configuration of Steam Turbine)

Figure 1:
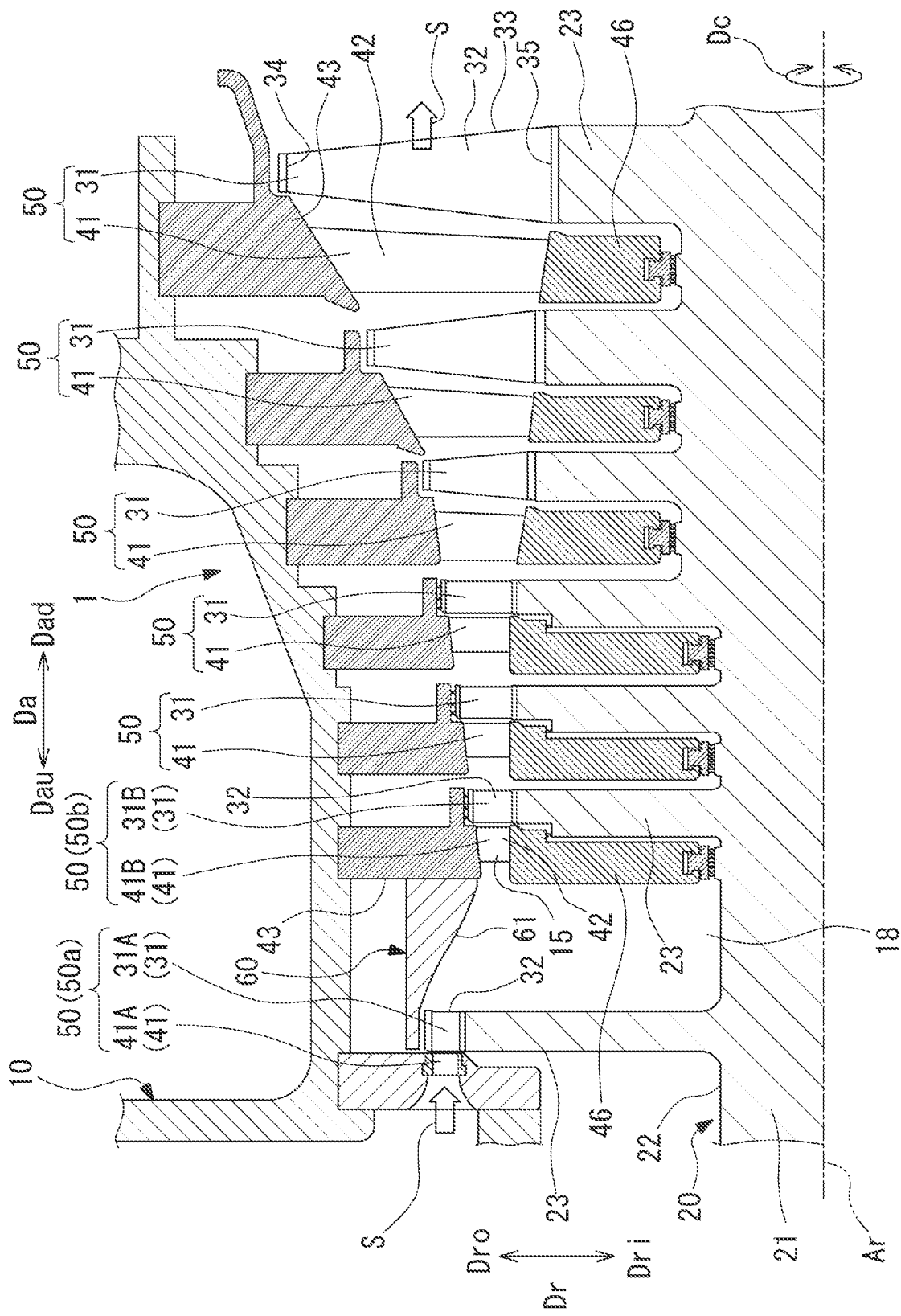
FIG. 1 is a cross-sectional view illustrating an upper half part of a steam turbine according to an embodiment of the present disclosure.

As illustrated in FIG. 1, a steam turbine 1 of the present embodiment includes a rotor 20 that rotates around an axis Ar, and a casing 10.

Incidentally, for convenience of the following description, a direction in which the axis Ar extends is referred to as an axial direction Da, a radial direction of a shaft core portion 22 to be described later with reference to the axis Ar is simply referred to as a radial direction Dr, and a circumferential direction of the shaft core portion 22 around the axis Ar is simply referred to as a circumferential direction Dc. In addition, a first side (one side) Dau in the axial direction Da is an upstream side in a flow direction of a steam (fluid) S inside the casing 10. A second side (the other side) Dad in the axial direction Da is a downstream side in the flow direction of the steam S inside the casing 10.

(Configuration of Rotor)

The rotor 20 includes a rotor shaft 21 and a rotor blade row 31. The rotor shaft 21 is rotatable with respect to the casing 10 around the axis Ar. The rotor shaft 21 includes the shaft core portion 22 and a plurality of disk portions 23. The shaft core portion 22 extends in the axial direction Da to have a columnar shape around the axis Ar. The plurality of disk portions 23 are disposed apart from each other in the axial direction Da. Each of the disk portions 23 is integrally formed with the shaft core portion 22 to widen from the shaft core portion 22 to an outer side Dro in the radial direction Dr.

(Configuration of Rotor Blade Row)

The rotor blade row 31 is fixed to the outer side Dro in the radial direction Dr of the rotor shaft 21. A plurality of the rotor blade rows 31 are disposed at intervals along the axial direction Da of the rotor shaft 21. In the case of the present embodiment, seven rotor blade rows 31 are provided. Therefore, in the case of the present embodiment, the rotor blade rows 31 of first to seventh stages are provided as the rotor blade rows 31.

Figure 2:
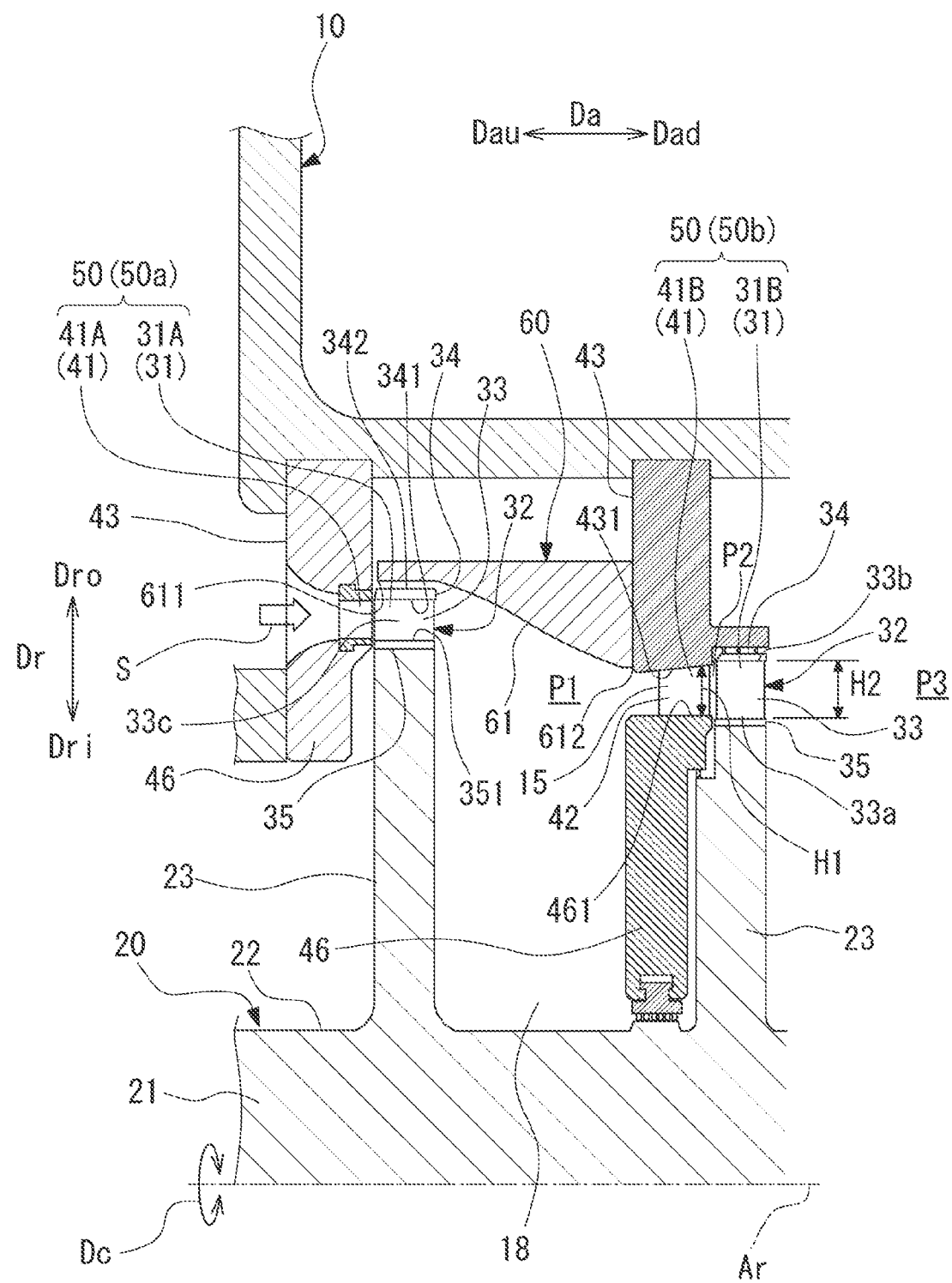
FIG. 2 is a cross-sectional view illustrating a configuration of a first stage and a second stage of the steam turbine.

Each of the rotor blade rows 31 includes a plurality of rotor blades 32 arranged at intervals in the circumferential direction Dc. As illustrated in FIG. 2, when the rotor blade rows 31 of the first and second stages are taken as an example, the rotor blades 32 are attached to outer peripheries of the disk portions 23 which are outer peripheral portions of the rotor shaft 21. Each of the rotor blades 32 includes a rotor blade body 33, a shroud 34, and a platform 35.

A plurality of the rotor blade bodies 33 are disposed at intervals in the circumferential direction Dc. Each of the rotor blade bodies 33 extends in the radial direction Dr. As seen in the axial direction Da, each of the rotor blade bodies 33 extends from an inner side Dri to the outer side Dro in the radial direction Dr so as to be inclined in a rotational direction of the rotor 20 in the circumferential direction Dc. Each of the rotor blade bodies 33 may be curved in a bow shape as seen in the axial direction Da such that a portion between a blade inner end portion 33a on the inner side Dri in the radial direction Dr and a blade outer end portion 33b on the outer side Dro in the radial direction Dr is recessed in the rotational direction of the rotor 20 in the circumferential direction Dc.

The shroud 34 and the platform 35 are disposed to correspond to each of the rotor blade bodies 33. The shroud 34 is disposed on the outer side Dro in the radial direction Dr of the rotor blade body 33. The platform 35 is disposed on the inner side Dri in the radial direction Dr of the rotor blade body 33.

The blade outer end portion 33b which is a tip in the radial direction Dr of the rotor blade body 33 is connected to a shroud inner peripheral surface 341 which is a surface of the shroud 34, the surface facing the inner side in the radial direction Dr. The blade inner end portion 33a which is a root in the radial direction Dr of the rotor blade body 33 is connected to a platform outer peripheral surface 351 which is a surface of the platform 35, the surface facing the outer side in the radial direction Dr. Therefore, the rotor blade body 33 is fixed to each of the shroud 34 and the platform 35. A space between the shroud 34 and the platform 35 forms part of a steam main flow path (main flow path) 15 through which the steam S flows inside the casing 10. Therefore, the rotor blade body 33 is disposed in the steam main flow path 15. The steam main flow path 15 extends across the plurality of rotor blade rows 31 and stator vane rows 41 inside the casing 10 in the axial direction Da. The steam main flow path 15 has an annular shape around the rotor 20.

(Configuration of Casing)

The casing 10 is provided to cover the rotor shaft 21 and the plurality of rotor blade rows 31, namely, the rotor 20. The steam main flow path 15 is formed inside the casing 10. The stator vane row 41 is fixed to the inner side Dri in the radial direction Dr of the casing 10. The plurality of stator vane rows 41 are disposed at intervals along the axial direction Da. In the case of the present embodiment, the number of rows of the stator vane rows 41 provided is 7 which is the same as that of the rotor blade rows 31. Therefore, in the case of the present embodiment, the stator vane rows 41 of first to seventh stages are provided as the stator vane rows 41. The plurality of stator vane rows 41 each are disposed on the first side Dau in the axial direction Da to be side by side with each of the plurality of rotor blade rows 31.

(Configuration of Stator Vane Row)

As illustrated in FIGS. 1 and 2, the stator vane row 41 includes a stator vane 42, an outer ring 43, and an inner ring 46. A plurality of stator vanes 42 are disposed at intervals in the circumferential direction Dc. The outer ring 43 is formed in an annular shape around the axis Ar. The outer ring 43 is disposed on the outer side Dro in the radial direction Dr of the plurality of stator vanes 42. The inner ring 46 is formed in an annular shape around the axis Ar. The inner ring 46 is disposed on the inner side Dri in the radial direction Dr of the plurality of stator vanes 42. Therefore, the plurality of stator vanes 42 are disposed between the outer ring 43 and the inner ring 46 in the radial direction Dr. A tip in the radial direction Dr of the stator vane 42 is connected to a ring inner peripheral surface 431 which is a surface of the outer ring 43, the surface facing the inner side in the radial direction Dr. A root in the radial direction Dr of the stator vane 42 is connected to a ring outer peripheral surface 461 which is a surface of the inner ring 46, the surface facing the outer side in the radial direction Dr. Therefore, the stator vane 42 is fixed to each of the outer ring 43 and the inner ring 46. A space having an annular shape between the ring inner peripheral surface 431 and the ring outer peripheral surface 461 forms part of the steam main flow path 15. Therefore, the stator vane 42 is disposed in the steam main flow path 15.

(Description of Stage)

Here, in the plurality of rotor blade rows 31 and the plurality of stator vane rows 41, a pair of each of the rotor blade rows 31 and the stator vane row 41 which is adjacent to the rotor blade row 31 on the first side Dau is referred to as a stage 50.

In the steam turbine 1, a first stator vane row 41A and a first rotor blade row 31A which form a first stage 50 located the farthest to the first side Dau in the axial direction Da form a speed adjusting stage 50a. The speed adjusting stage 50a regulates a flow of the steam S to be sent to the stage 50 on the second side Dad in the axial direction Da, to adjust the rotation speed of the rotor 20. The first stator vane row 41A is disposed the farthest to the first side Dau in the axial direction Da among the plurality of stator vane rows 41. The first rotor blade row 31A is disposed side by side with the first stator vane row 41A to be close to the second side Dad in the axial direction Da. Therefore, the first rotor blade row 31A is disposed on the farthest to the first side Dau in the axial direction Da among the plurality of rotor blade rows 31.

The speed adjusting stage 50a and a second stage 50b adjacent to the speed adjusting stage 50a on the second side Dad are disposed to be spaced apart by a space 18 from each other, the space 18 having a predetermined dimension in the axial direction Da. The space 18 forms a part of the steam main flow path 15. The second stage 50b includes a second stator vane row 41B and a second rotor blade row 31B. The second stator vane row 41B is disposed on the second side Dad in the axial direction Da to be spaced apart by the space 18 from the first rotor blade row 31A. The second rotor blade row 31B is disposed side by side with the second stator vane row 41B to be close to the second side Dad in the axial direction Da.

(Positional Relationship Between Rotor Blade Row of First Stage and Stator Vane Row of Second Stage)

As illustrated in FIG. 2, when seen in the circumferential direction Dc orthogonal to the axial direction Da, the second stator vane row 41B forming the second stage 50b is disposed farther to the inner side Dri in the radial direction Dr than the first rotor blade row 31A forming the speed adjusting stage 50a. Specifically, when seen in the circumferential direction Dc, the ring outer peripheral surface 461 which is the outer peripheral surface of the inner ring 46 of the second stator vane row 41B is disposed farther to the inner side Dri in the radial direction Dr than the platform outer peripheral surface 351 which is the outer peripheral surface of the platform 35 of the first rotor blade row 31A.

In addition, when seen in the circumferential direction Dc, the ring inner peripheral surface 431 which is the inner peripheral surface of the outer ring 43 of the second stator vane row 41B is disposed farther to the inner side Dri in the radial direction Dr than the shroud inner peripheral surface 341 which is the inner peripheral surface of the shroud 34 of the first rotor blade row 31A. Furthermore, it is preferable that when seen in the circumferential direction Dc, the ring inner peripheral surface 431 of the second stator vane row 41B is disposed farther to the inner side Dri in the radial direction Dr than an intermediate portion 33c in the radial direction Dr of the rotor blade body 33 of the first rotor blade row 31A. In the embodiment of the present disclosure, when seen in the circumferential direction Dc, the ring inner peripheral surface 431 of the second stator vane row 41B is disposed farther to the inner side Dri in the radial direction Dr than the platform outer peripheral surface 351 which is the outer peripheral surface of the platform 35 of the first rotor blade row 31A.

(Configuration of Guide Member)

As illustrated in FIG. 2, a guide member 60 is disposed between the first rotor blade row 31A and the second stator vane row 41B. The guide member 60 guides the steam S from the first rotor blade row 31A toward the second stator vane row 41B. The guide member 60 of the present embodiment is fixed to the outer ring 43 of the second stator vane row 41B. The guide member 60 is formed in a tubular shape and extends from the outer ring 43 toward the first side Dau in the axial direction Da. A guide surface 61 facing the inner side Dri in the radial direction Dr is formed in the guide member 60.

The guide surface 61 extends from the first side Dau toward the second side Dad in the axial direction Da so as to be inclined toward the inner side Dri in the radial direction Dr. The guide surface 61 extends in an inclined manner from a shroud outer peripheral surface 342 which is a surface of the shroud 34, the surface facing the outer side in the radial direction Dr, toward the ring inner peripheral surface 431 of the second stator vane row 41B. Accordingly, the inner diameter of the guide member 60 is gradually reduced from the first side Dau to the second side Dad. Therefore, the cross-sectional area orthogonal to the axis Ar of the space 18 (flow path cross-sectional area of the space 18), which has an annular shape and is formed between the guide surface 61 and an outer peripheral surface of the shaft core portion 22 of the rotor shaft 21 between the first rotor blade row 31A and the second stator vane row 41B, is gradually reduced from the first side Dau to the second side Dad. Incidentally, in a cross-sectional view along the axial direction Da, the guide surface 61 may extend linearly or be curved from a front end 611 on the first side Dau toward a rear end 612 on the second side Dad.

In addition, the front end 611 in the axial direction Da of the guide surface 61 is disposed on the outer side Dro in the radial direction Dr with respect to the shroud 34 of the first rotor blade row 31A. Accordingly, the guide surface 61 and the shroud 34 overlap each other when seen in the radial direction Dr. In addition, it is preferable that the interval in the radial direction Dr between the front end 611 of the guide surface 61 and the shroud 34 is reduced as small as possible to suppress the steam from leaking from therebetween. The front end 611 in the axial direction Da of the guide surface 61 is disposed on the outer side Dro in the radial direction Dr with respect to the shroud 34 of the first rotor blade row 31A. The rear end 612 in the axial direction Da of the guide surface 61 is disposed at the same position as the position in the radial direction Dr of the ring inner peripheral surface 431 of the second stator vane row 41B.

(Flow of Steam from First Stage to Second Stage)

The steam S which has passed between the outer ring 43 and the inner ring 46 of the first stator vane row 41A and between the shroud 34 and the platform 35 of each of the rotor blades 32 of the first rotor blade row 31A flows toward the inner side Dri in the radial direction Dr due to the guide surface 61 of the guide member 60 as the steam S approaches the second side Dad. Thereafter, the steam S which has reached the second stator vane row 41B passes between the outer ring 43 and the inner ring 46 of the second stator vane row 41B and between the shroud 34 and the platform 35 of each of the rotor blades 32 of the second rotor blade row 31B.

Here, the reaction degree will be described.

A reaction degree R is the ratio of the thermal head of the rotor blades 32 of the stage 50 to the thermal head of the stage 50. In other words, the reaction degree R is the ratio of the amount of change in static enthalpy of the rotor blades 32 to the amount of change in total enthalpy of the stage 50. Alternatively, the reaction degree is the ratio of the pressure difference of the rotor blades 32 of the stage 50 to the pressure difference of the stage 50.

Therefore, when the pressure of the steam S upstream of the second stator vane row 41B is P1, the pressure of the steam S downstream of the second stator vane row 41B and upstream of the second rotor blade row 31B is P2, and the pressure downstream of the second rotor blade row 31B is P3, the reaction degree R of the second stage 50b is expressed by the following equation.

$$R=(P2-P3)/(P1-P3)$$

Incidentally, when the reaction degree is 0, there is no change in pressure of the rotor blades 32. On the other hand, when the reaction degree is not 0, there is a decrease in pressure of the rotor blades 32, whereas there is an increase in flow speed of the steam S in the rotor blades 32. For this reason, when the reaction degree is not 0, the steam S expands in the process of passing through the rotor blades 32. The reaction force generated by the expansion is applied to the rotor blades 32. When the reaction degree is 0, only the impulse action of the steam S is work of the steam S on the rotor blades 32, and when the reaction degree is not 0, in addition the impulse action of the steam S, the reaction work is work of the steam on the rotor blades 32. Therefore, the larger the reaction degree is, the higher the blade-element performance basically is.

In each of the rotor blade rows 31, the rotor blade row 31 rotates around the axis Ar together with the rotor shaft 21, so that a centrifugal force toward the outer side Dro in the radial direction Dr is applied to the flow of the steam S downstream of the rotor blade row 31. For this reason, in each of the stator vanes 42, the flow of the steam S is likely to be biased to a position close to the outer ring 43 on the outer side Dro in the radial direction Dr. Meanwhile, the steam S which has passed through the first rotor blade row 31A is guided by the guide surface 61 of the guide member 60 to flow toward the inner ring 46 on the inner side Dri in the radial direction Dr of the second stator vane row 41B. Accordingly, in the stator vanes 42, the flow of the steam S is suppressed from being biased to the vicinity of the outer ring 43 on the outer side Dro in the radial direction Dr. As a result, in the stator vanes 42, the pressure of the steam S in the vicinity of the inner ring 46 on the inner side Dri in the radial direction Dr can be increased. Since in such a manner, the pressure of the steam S in the vicinity of the inner ring 46 of the stator vanes 42 in the second stator vane row 41B is increased, a decrease in reaction degree R can be suppressed.

Effects

In the steam turbine 1 with the above configuration, the steam S which has passed through the first rotor blade row 31A is guided by the guide surface 61 of the guide member 60 to be sent to the vicinity of the inner ring 46 of the stator vanes 42 of the second stator vane row 41B. As a result, the pressure of the steam S in the vicinity of the inner ring 46 of the stator vanes 42 is increased. Accordingly, the pressure difference between the upstream side and the downstream side of the second stator vane row 41B and the second rotor blade row 31B can be increased. Therefore, even when the rotation speed of the first rotor blade row 31A is decreased, a decrease in reaction degree is suppressed, and thereby, the backflow of the steam S can be suppressed.

In addition, since the flow of the steam S is guided to the inner side Dri in the radial direction Dr between the first rotor blade row 31A which is the so-called speed adjusting stage 50a located the farthest to the first side Dau in the axial direction Da and the second stator vane row 41B located downstream of the first rotor blade row 31A, even when the rotation speed of the rotor blade row 31 of the speed adjusting stage 50a is decreased, a decrease in reaction degree is suppressed, and thereby, the backflow of the steam S can be suppressed.

In addition, the front end 611 of the guide member 60 is disposed on the outer side Dro in the radial direction Dr of the shroud 34 of the first rotor blade row 31A. Accordingly, the steam which has flown downstream from the first rotor blade row 31A is suppressed from leaking to the outer side Dro in the radial direction Dr of the shroud 34. As a result, the steam can be efficiently guided to the second stator vane row 41B.

In addition, the flow of the steam S guided to the inner side Dri in the radial direction Dr by the guide surface 61 is guided to the inner side Dri in the radial direction Dr of the outer ring 43 of the second stator vane row 41B disposed farther to the inner side Dri in the radial direction Dr than the shroud 34 of the first rotor blade row 31A. Accordingly, the pressure of the steam S in the second stator vane row 41B can be reliably increased.

Further, the flow of the steam S guided to the inner side Dri in the radial direction Dr by the guide surface 61 is guided to the inner side Dri in the radial direction Dr of the outer ring 43 of the second stator vane row 41B disposed farther to the inner side Dri in the radial direction Dr than the intermediate portion in the radial direction Dr of the rotor blade body 33 of the first rotor blade row 31A. Accordingly, the pressure of the steam S in the second stator vane row 41B can be further reliably increased.

In addition, the flow of the steam S guided to the inner side Dri in the radial direction Dr by the guide surface 61 is guided to the inner side Dri in the radial direction Dr of the ring inner peripheral surface 431 of the outer ring 43 of the second stator vane row 41B disposed farther to the inner side Dri in the radial direction Dr than the platform outer peripheral surfaces 351 of the first rotor blade row 31A. Accordingly, the pressure of the steam S in the second stator vane row 41B can be further increased.

Other Embodiments

The embodiment of the present disclosure has been described with reference to the drawings; however, the specific configuration is not limited to the embodiment, and a design change and the like are included without departing from the concept of the present disclosure.

Incidentally, the guide member 60 may have a structure that guides the steam S from the first rotor blade row 31A toward the second stator vane row 41B. Therefore, the guide member 60 is not limited to being fixed to the outer ring 43 of the second stator vane row 41B. For example, the guide member 60 may be fixed to the casing 10.

In addition, the configuration of each part of the steam turbine 1 can be appropriately changed.

APPENDIX

The steam turbine 1 described in the embodiment is comprehended, for example, as follows.

(1) The steam turbine 1 according to a first aspect includes the rotor shaft 21 that is configured to rotate around the axis Ar; the plurality of rotor blade rows 31 that are fixed to the outer side Dro of the rotor shaft 21 in the radial direction Dr with respect to the axis Ar and are disposed at intervals in the axial direction Da in which the axis Ar extends; the casing 10 which covers the rotor shaft 21 and the plurality of rotor blade rows 31 and inside which the main flow path through which the fluid flows is formed; the plurality of stator vane rows 41 that each are fixed to the inner side Dri of the casing 10 in the radial direction Dr and are disposed on the first side Dau in the axial direction Da with respect to each of the plurality of rotor blade rows 31; and the guide member 60 that is disposed between the first rotor blade row 31A disposed the farthest to the first side Dau in the axial direction Da among the plurality of rotor blade rows 31 and the second stator vane row 41B disposed on the second side Dad in the axial direction Da with respect to the first rotor blade row 31A, to configured to guide the fluid from the first rotor blade row 31A toward the second stator vane row 41B. Each of the plurality of rotor blade rows 31 includes the plurality of rotor blade bodies 33 disposed in the main flow path, the shroud 34 disposed on the outer side Dro with respect to each of the plurality of rotor blade bodies 33 in the radial direction Dr to correspond to each of the rotor blade bodies 33, and the platform 35 disposed on the inner side Dri with respect to each of the plurality of rotor blade bodies 33 in the radial direction Dr to correspond to each of the plurality of rotor blade bodies 33. Each of the plurality of stator vane rows 41 includes the plurality of stator vanes 42 disposed in the main flow path, the outer ring 43 having an annular shape and disposed on the outer side Dro with respect to each of the plurality of stator vanes 42 in the radial direction Dr, and the inner ring 46 having an annular shape and disposed on the inner side Dri with respect to each of the plurality of stator vanes 42 in the radial direction Dr. When seen in the circumferential direction Dc, the outer peripheral surface of the inner ring 46 of the second stator vane row 41B is disposed farther to the inner side Dri in the radial direction Dr than the outer peripheral surface of the platform 35 of the first rotor blade row 31A. The guide member 60 has the guide surface 61 that extends from the outer peripheral surface of the shroud 34 of the first rotor blade row 31A toward the inner peripheral surface of the outer ring 43 of the second stator vane row 41B so as to be inclined toward the inner side Dri in the radial direction Dr as the guide surface 61 approaches the second side Dad from the first side Dau in the axial direction Da.

In the steam turbine 1, the steam S which has passed through the first rotor blade row 31A is guided by the guide surface 61 of the guide member 60 to be sent to the vicinity of the inner ring 46 of the stator vanes 42 of the second stator vane row 41B. As a result, the pressure of the steam S in the vicinity of the inner ring 46 of the stator vanes 42 is increased. Accordingly, the pressure difference between the upstream side and the downstream side of the second stator vane row 41B and the second rotor blade row 31B can be increased. Therefore, even when the rotation speed of the first rotor blade row 31A is decreased, a decrease in reaction degree is suppressed, and thereby, the backflow of the steam S can be suppressed.

(2) In the steam turbine 1 according to a second aspect, according to the steam turbine 1 of (1), the front end of the guide surface 61 on the first side Dau in the axial direction Da is disposed on the outer side Dro in the radial direction Dr with respect to the shroud 34 of the first rotor blade row 31A.

Accordingly, the steam which has flown downstream from the first rotor blade row 31A is suppressed from leaking to the outer side Dro in the radial direction Dr of the shroud 34. As a result, the steam can be efficiently guided to the second stator vane row 41B.

(3) In the steam turbine 1 according to a third aspect, according to the steam turbine 1 of (1) or (2), the inner peripheral surface of the outer ring 43 of the second stator vane row 41B is disposed farther to the inner side Dri in the radial direction Dr than the inner peripheral surface of the shroud 34 of the first rotor blade row 31A.

Accordingly, the flow of the steam S guided to the inner side Dri in the radial direction Dr by the guide surface 61 is guided to the inner side Dri in the radial direction Dr of the outer ring 43 of the second stator vane row 41B disposed farther to the inner side Dri in the radial direction Dr than the shroud 34 of the first rotor blade row 31A. Accordingly, the pressure of the steam S in the second stator vane row 41B can be reliably increased.

(4) In the steam turbine 1 according to a fourth aspect, according to the steam turbine 1 of (3), the inner peripheral surface of the outer ring 43 of the second stator vane row 41B is disposed farther to the inner side Dri in the radial direction Dr than the intermediate portion of the rotor blade body 33 of the first rotor blade row 31A in the radial direction Dr.

Accordingly, the flow of the steam S guided to the inner side Dri in the radial direction Dr by the guide surface 61 is guided to the inner side Dri in the radial direction Dr of the outer ring 43 of the second stator vane row 41B disposed farther to the inner side Dri in the radial direction Dr than the intermediate portion in the radial direction Dr of the rotor blade body 33 of the first rotor blade row 31A. Accordingly, the pressure of the steam S in the second stator vane row 41B can be further reliably increased.

(5) In the steam turbine 1 according to a fifth aspect, according to the steam turbine 1 of (4), the inner peripheral surface of the outer ring 43 of the second stator vane row 41B is disposed farther to the inner side Dri in the radial direction Dr than the outer peripheral surface of the platform 35 of the first rotor blade row 31A.

Accordingly, the flow of the steam S guided to the inner side Dri in the radial direction Dr by the guide surface 61 is guided to the inner side Dri in the radial direction Dr of the inner peripheral surface of the outer ring 43 of the second stator vane row 41B disposed farther to the inner side Dri in the radial direction Dr than the outer peripheral surfaces of the first rotor blade row 31A. Accordingly, the pressure of the steam S in the second stator vane row 41B can be further increased.

EXPLANATION OF REFERENCES

1 Steam turbine
10 Casing
15 Steam main flow path (main flow path)
18 Space
20 Rotor
21 Rotor shaft
22 Shaft core portion
23 Disk portion
31 Rotor blade row
31A First rotor blade row
31B Second rotor blade row
32 Rotor blade
33 Rotor blade body
33a Blade inner end portion
33b Blade outer end portion
33c Intermediate portion
34 Shroud
341 Shroud inner peripheral surface
342 Shroud outer peripheral surface
35 Platform
351 Platform outer peripheral surface
41 Stator vane row
41A First stator vane row
41B Second stator vane row
42 Stator vane
43 Outer ring
431 Ring inner peripheral surface
46 Inner ring
461 Ring outer peripheral surface
50 Stage
50a Speed adjusting stage
50b Second stage
60 Guide member
61 Guide surface
611 Front end
612 Rear end
Ar Axis
Da Axial direction
Dau First side
Dad Second side
Dc Circumferential direction
Dr Radial direction
Dri Inner side
Dro Outer side
P1 Pressure
P2 Pressure
R Reaction degree
S Steam

What is claimed is:
1. A steam turbine comprising:
a rotor shaft that is configured to rotate around an axis;
a plurality of rotor blade rows that are fixed radially outward with respect to the rotor shaft and are disposed at intervals in an axial direction in which the axis extends;

a casing which covers the rotor shaft and the plurality of rotor blade rows and wherein a main flow path through which a fluid flows is formed inside of the casing;

a plurality of stator vane rows that are each fixed radially inward with respect to the casing and are disposed on an upstream side in the axial direction with respect to each of the plurality of rotor blade rows; and a guide member that is disposed axially between a first stator vane row and a second stator vane row, wherein the guide member is configured to guide the fluid from a first rotor blade row toward the second stator vane row, wherein each of the plurality of rotor blade rows includes
a plurality of rotor blade bodies disposed in the main flow path,
a shroud disposed radially outward with respect to each of the plurality of rotor blade bodies to correspond to each of the plurality of rotor blade bodies, and
a platform disposed radially inward with respect to each of the plurality of rotor blade bodies to correspond to each of the rotor blade bodies, wherein each of the plurality of stator vane rows includes
a plurality of stator vanes disposed in the main flow path,
an outer ring having an annular shape and disposed radially outward with respect to each of the plurality of stator vanes, and
an inner ring having an annular shape and disposed radially inward with respect to each of the plurality of stator vanes, wherein an outer peripheral surface of the inner ring of the second stator vane row is disposed radially inward with respect to the axis than an outer peripheral surface of the platform of the first rotor blade row, wherein the guide member has a guide surface that extends from an outer peripheral surface of the shroud of the first rotor blade row toward an inner peripheral surface of the outer ring of the second stator vane row so as to be inclined radially inward, wherein a rear end in the axial direction of the guide surface is disposed at a same radial position as a position of the inner peripheral surface of the outer ring of the second stator vane row and wherein the rear end of the guide surface is radially disposed closest to the axis, and wherein the guide member is:
a separate member from the casing,
fixed to the outer ring of the second stator vane row,
spaced apart from the first stator vane row disposed on the upstream side in the axial direction with respect to the first rotor blade row, and
formed in a tubular shape.

2. The steam turbine according to claim 1, wherein a front end of the guide surface is disposed radially outward with respect to the shroud of the first rotor blade row.

3. The steam turbine according to claim 1, wherein the inner peripheral surface of the outer ring of the second stator vane row is disposed radially inward with respect to the axis than an inner peripheral surface of the shroud of the first rotor blade row.

4. The steam turbine according to claim 3, wherein the inner peripheral surface of the outer ring of the second stator vane row is disposed radially inward with respect to the axis than an intermediate portion of each rotor blade body of the first rotor blade row.

5. The steam turbine according to claim 4, wherein the inner peripheral surface of the outer ring of the second stator vane row is disposed radially inward with respect to the axis than the outer peripheral surface of each platform of the first rotor blade row.

* * * * *